United States Patent [19]
Teece et al.

[11] Patent Number: 6,144,796
[45] Date of Patent: *Nov. 7, 2000

[54] VIDEO DATA SYSTEM

[75] Inventors: Howard John Teece, Winchester; Stephen Mark Keating, Reading, both of United Kingdom

[73] Assignees: Sony Corporation, Tokyo, Japan; Sony United Kingdom Limited, Weybridge, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/855,945

[22] Filed: May 14, 1997

[30] Foreign Application Priority Data

May 23, 1996 [GB] United Kingdom .................. 9610802

[51] Int. Cl.$^7$ .......................... H04N 5/761; H04N 5/7617
[52] U.S. Cl. ..................................... 386/46; 386/83; 348/7
[58] Field of Search .................................. 386/46, 83, 92, 386/52, 1, 4, 109; 348/7, 8, 12, 6; H04N 5/761, 5/7617

[56] References Cited

U.S. PATENT DOCUMENTS 5,442,390  8/1995  Hooper et al. .............................. 348/7

FOREIGN PATENT DOCUMENTS

0670542 A1  9/1995  European Pat. Off. .
WO 96/10315 A1  4/1996  WIPO .

Primary Examiner—Robert Chevalier
Attorney, Agent, or Firm—Frommer Laurence & Haug,LLP.; William S. Frommer; Joe H. Shallenburger

[57] ABSTRACT

Apparatus 10 for providing a plurality of output video signals for near video on demand transmission, said apparatus 10 comprising: a control unit 30 connected to a primary video data storage unit 20 for receiving video data therefrom; and a temporary storage and replay array 50 for storing and replaying said video data, said array comprising of a plurality of serially connected individual storage units 60(1) ... 60(n), a first 60(1) of said storage units being connected to said control unit 30 for data transfer therebetween; wherein, in use, data is transferred sequentially from said control unit 30 to said first storage unit 60(1) for transmission, said first storage unit 60(1) retransferring said data to a second 60(2) and subsequent storage units for retransmission.

21 Claims, 4 Drawing Sheets

VIDEO DATA SYSTEM

BACKGROUND OF THE INVENTION

1. Field of the Invention

This invention relates to a data system and more particularly to a data system that enables near video on demand transmission.

2. Description of the Prior Art

Near video on demand transmission (NVOD) is a multi-channel transmission technique that plays a motion-picture film (or other broadcast material) with fixed offset start times. If, for example, this offset start time was 8 minutes, then consumers would never have to wait longer than 8 minutes to see a film from the very beginning. This start time is commonly referred to in the art as "a spur".

NVOD is not in itself a new technology and various different apparatus have been manufactured to enable its implementation.

A typical prior art arrangement is to provide a RAID array of hard disks each of which has a high input bandwidth of around 250 Mbps (megabits per second). The RAID array is burst fed by video data from a high speed video data storage device. The RAID array then outputs its information to each channel at a much lower bandwidth (typically between 4 to 10 Mbps) for viewing. The RAID array typically has an input bandwidth some 25 times that of the final output bandwidth of each channel. This prior art arrangement is of a large physical size and is unduly expensive to manufacture. Much of that expense is incurred by providing a RAID array that, by necessity, has an input bandwidth that is much higher than the required output bandwidth.

An alternative apparatus that seeks to address some of these problems utilises magneto-optical (MO) storage systems to reduce the required input/output bandwidth. In one such example, an MO disk storage system feeds 16 decoders, each operating at around 4 megabits per second. In this example, the MO disk has an input bandwidth some 16 times that of the final output bandwidth and so, the input bandwidth has been reduced in comparison to that of the first example given above. However, in order to achieve this reduction in input bandwidth, an MO technology has to be used that requires all video data to be preformatted on an MO disk. Any subsequent changes, such as censoring, of the preformatted video data would require a repeat formatting of the MO disk with the new information. Thus, the new apparatus, whilst having a reduced input bandwidth, is now relatively inflexible as it requires a special formatting of the video data prior to its transmission.

SUMMARY OF THE INVENTION

It is an object of the invention to address some or all of the problems associated with the prior art.

In accordance wit the present invention, there is provided apparatus for providing a plurality of output video signals for near video on demand transmission, said apparatus comprising:

(a) a control unit connected to a primary video data storage means for receiving video data therefrom; and (b) a temporary storage and replay array for storing and replaying said video data, said array comprising a plurality of serially connected individual storage units, a first of said storage units being connected to said control unit for data transfer therebetween;

wherein, in use, data is transferred sequentially from said control unit to said first storage unit for transmission, said first storage unit retransferring said data to a second and subsequent storage units for retransmission.

In this way, a data system is provided that utilises storage units that need only have a data bandwidth that is twice that of any required output bandwidth, i.e. sufficient to read in and write out at the output bandwidth. This reduction in required bandwidth enables the utilisation of relatively inexpensive storage media.

In one embodiment, the primary video data storage means is a conventional speed video tape recorder. This embodiment allows the present invention to provide NVOD transmission using conventional and inexpensive equipment.

In another embodiment, the control unit is connected to at least one slave unit, each of the slave units being connected to an associated storage and replay array, data from the primary video data storage means being directed to specific slave units.

Alternatively, the control unit may be connected to an array of serially connected slave units, each of the slave units being connected to an associated storage and replay array, data from the primary video data storage means being directed to specific slave units.

In either case, it is preferred that the control unit directs incoming data from the primary video data storage means to any of the storage and replay arrays connected to the control unit and specific ones of the at least one slave unit.

Thus, the control unit is able to control multiple NVOD streams so spreading the cost of the control unit.

In this case, it is preferred that the primary data storage means is at least one high speed video data recorder. In which case, the data may be burst fed to the control unit at a burst rate substantially higher than the near video on demand transmission rate. Such an arrangement allows the provision of a plurality of different offset transmissions from a single primary video data storage means, e.g. more than one feature film at a time.

Alternatively, the primary video data storage means may be a high speed video tape recorder, the high speed video tape recorder supplying data to the control unit in bursts, the burst rate being substantially higher than the array's transmission rate.

Preferably, the burst data rate is substantially 128 Mbps or 256 Mbps, and the array's NVOD transmission rate is approximately 8 Mbps. This provides a good balance between cost, data storage capacity and image quality.

Preferably, the control unit includes a router for directing information from the data storage means to individual ones of the storage and replay arrays. This allows flexibility in the control of the system.

Preferably, the at least one slave unit includes a logic unit for recognising data destined for that unit, and a buffer for storing data prior to the transferal of that data to the attached array. This allows the flexibility to attach the slave units with a bus structure.

In all of the above embodiments, the individual storage units may be computer hard disks. In any event, it is preferred that the individual storage units have a bandwidth twice that of the near video on demand transmission bandwidth. This allows the cost of the system to be reduced in comparison to prior art systems.

Preferably, each of the individual storage units includes a video data decoder, the data being transferred to respective video data decoders for transmission.

Any of the above embodiments may include a switch under control of the control unit for initiating a feedback path, the feedback path comprising a connection between a last unit of the array and the first unit such that the data, once introduced into the array, may be continuously circulated therein.

The present invention also extends to a method of a method of providing a plurality of output video signals for near video on demand transmission, the method comprising the steps of:

(i) replaying video data from a primary video data storage means to a control unit;

(ii) transferring said data from said control unit to at least one temporary storage and replay array comprising a plurality of individual storage units, a first storage unit of said storage and replay array being connected to said control unit;

wherein, in use, said data is transferred sequentially from said control unit to said first storage unit for transmission, said first storage unit retransferring said data to a second and subsequent storage units for retransmission.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
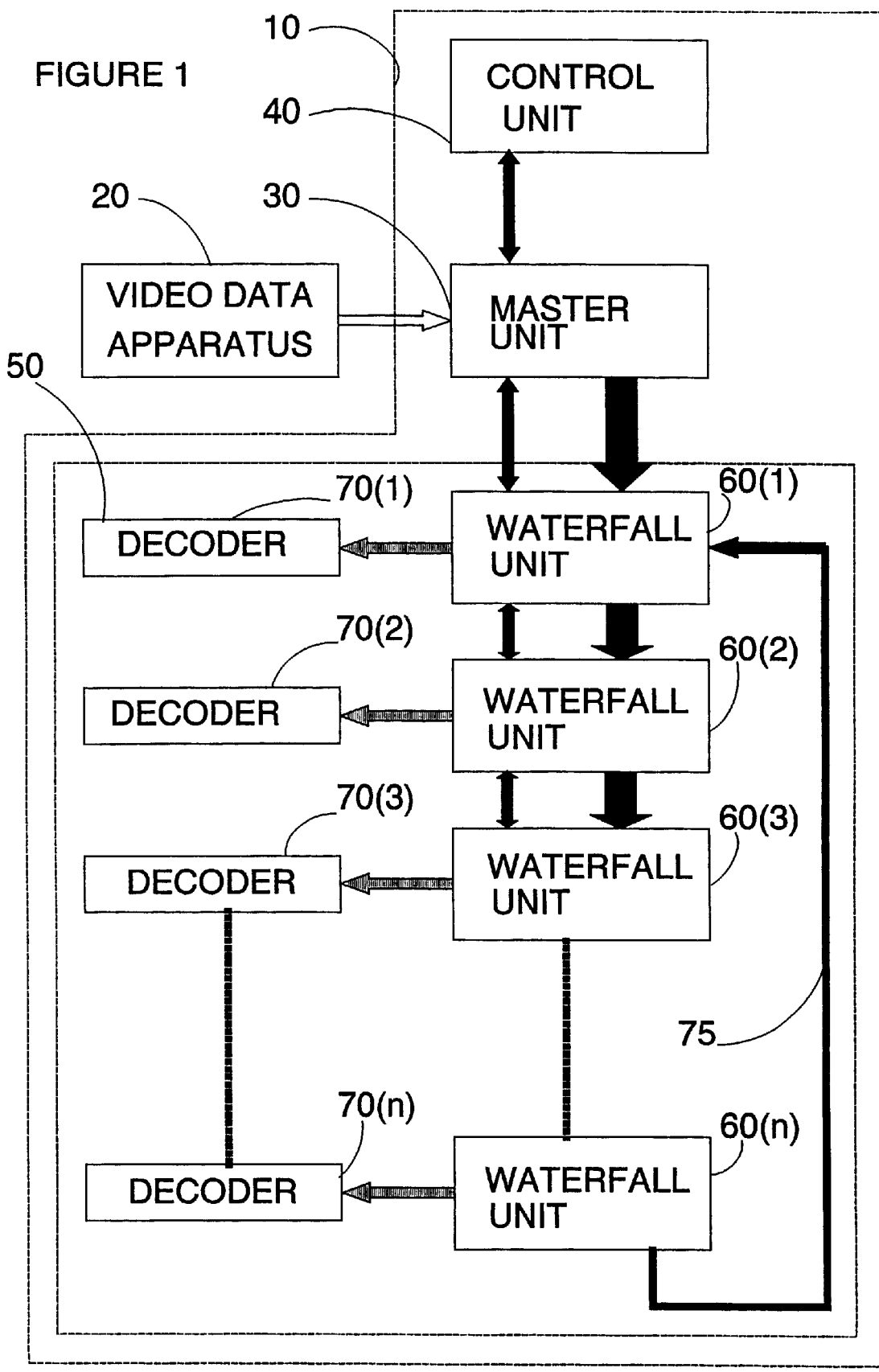
FIG. 1 is a schematic representation of an NVOD server utilising conventional replay technology.

With reference to FIG. 1, one embodiment of an NVOD system is shown. Advantageously, the NVOD system 10 is designed as a bolt-on system that may be utilised with conventional video data replay apparatus 20. In this way, persons purchasing the system 10 may still utilise their existing equipment.

The NVOD system 10 comprises a master unit 30, a control terminal and/or display 40 and a waterfall storage array 50. The waterfall storage array 50 comprises a plurality of waterfall storage units indexed 60(1) to 60(n) and a plurality of associated decoders indexed 70(1) to 70(n). The control terminal/display 40 provides control information about the status of the system 10 to an operator. The operator may also use the control terminal 40 to program the master unit 30.

The waterfall units 60(1) to 60(n) are storage media that advantageously only require a data transfer bandwidth that is twice the bandwidth required to provide data for a continuous video output. This architecture enables the waterfall units 60(1) to 60(n) to comprise inexpensive disk storage media. Obviously, other storage media could alternatively be used, but, in order to reduce expenditure, it is preferred that standard AT bus hard disks are used. In this example, for an output rate of approximately 8 Mbps to feed a conventional video channel and a delay spur of 15 minutes, each waterfall unit may be a relatively small AT bus hard disk having a storage capacity of approximately 900 MB.

At this point, it is appropriate to note that whilst the Figures only show the flow of video data, other data types are being transferred throughout the system. For example, control data emanates from the master unit and is passed to the waterfall units, decoders and, in later embodiments, to slave units. These components return control data to the master unit which monitors and controls the entire system. The flow of these other data types have been omitted from the Figures in order to clarify them.

In use, video data stored on the video data replay apparatus 20 is replayed to the master unit 30. The master unit 30 then plays out the video data to the first waterfall unit 60(1). The first waterfall unit 60(1) then performs two functions.

Firstly, it replays the data transferred from the master unit from its own internal store to the first decoder 70(1). Then, the stored data is transferred in bursts to the second waterfall unit 60(2). The second waterfall unit 60(2) then replays the data from the first waterfall unit 60(1) via the second decoder 70(2) and transfers that data on to the third waterfall unit 60(3).

If the first waterfall unit 60(1) is being effectively continuously fed by the master unit then a near video on demand transmission sequence is created whereby each waterfall unit is replaying video data that has already been replayed by the preceding waterfall units. In this way, each waterfall unit has a transmission delay spur in comparison to the waterfall unit immediately thereabove.

As mentioned above, this arrangement is particularly suitable for use with existing video data replay apparatus. However, the video data replay apparatus 20 need not be a conventional video data replay apparatus, it could be a high speed video tape recorder. In which case, the video tape recorder 20 could burst feed the master unit 20 with sufficient data to cover one transmission spur. The video tape recorder 20 would then lie idle until the next quantity of data is required by the master unit 30.

As an option, the waterfall unit may include an optional feedback path 75 which would connect the last waterfall unit (60)(n) to the first waterfall unit 60(1). If such a feedback path 75 were to be utilised, then the video data information could be locked within the waterfall storage array 50 for continuous replay. Such an arrangement may be desirable for the replay of motion pictures for example. Alternatively, the feedback path could operate for, say, three showings of a motion picture and then be automatically disconnected so that new material may be fed to the first waterfall unit 60(1). That new material may be in the form of a second different motion picture. Such an arrangement would necessitate the provision of a switch to enable and disable the feedback path 75. Preferably, that switch would be under the control of the master unit 30.

If this embodiment is used with a conventional speed video data replay apparatus 20, then it may be sold as a bolt-on unit for use with conventional video tape recorders. In this way, conventional video tape recorders would be provided with NVOD transmission capabilities at a significantly reduced cost.

Alternatively, as will be described in later embodiments, the present system may be utilised with high-speed data apparatus in order to enable the provision of a multitude of different time shifted transmissions.

Figure 2:
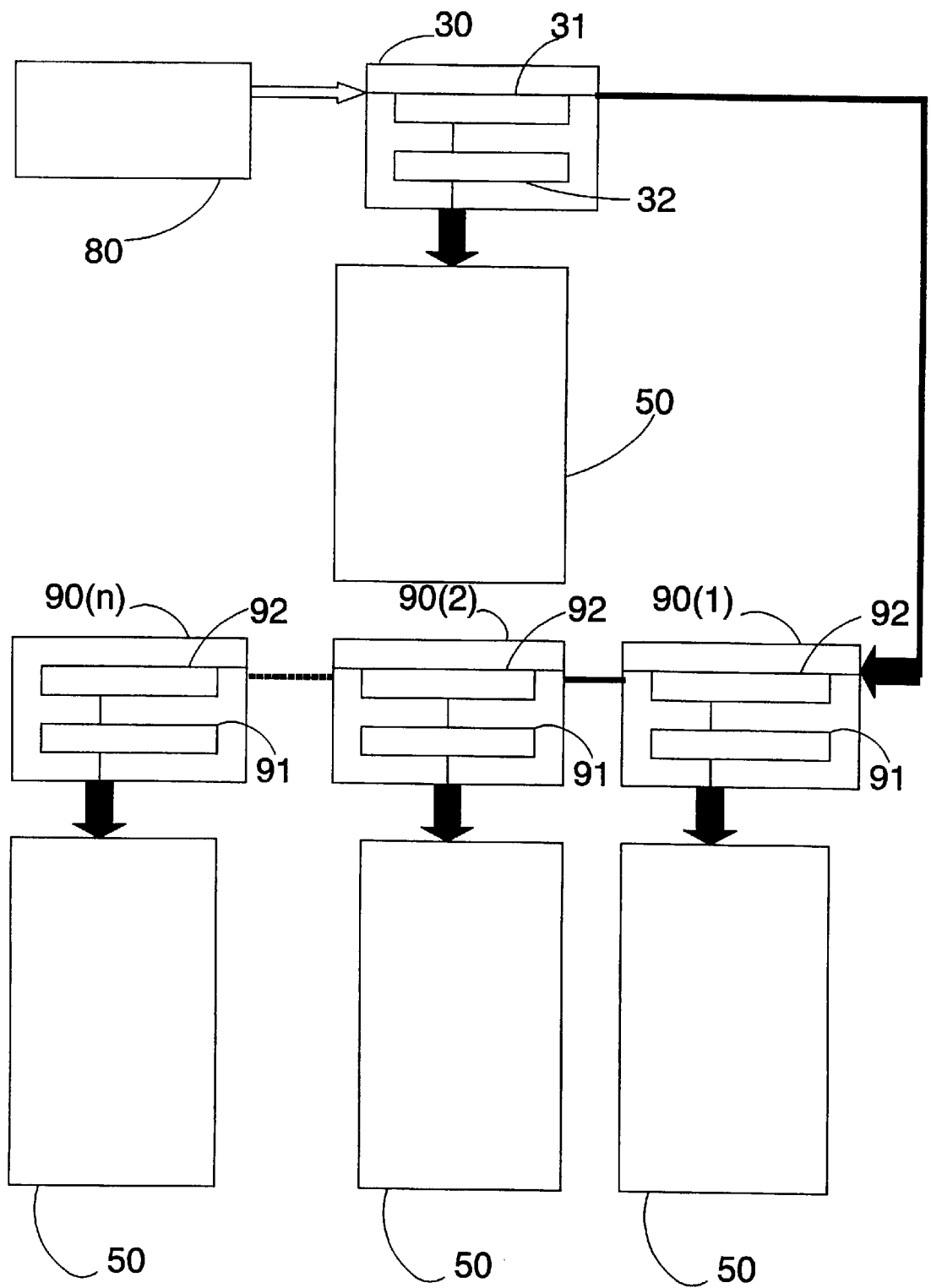
FIG. 2 is a schematic representation of one embodiment of an NVOD server utilising the improved technology of a multi-channel video storage device as described in British Published Patent Application GB-A-2 287 845.

FIG. 2 illustrates a second embodiment of the present invention which is suitable for use with a high speed data replay apparatus. As mentioned above, such a high speed data replay apparatus is described in British Published Patent Application GB-A-2 287 845. That high speed video data replay apparatus has been marketed and sold by Sony Corporation under the trade name DIR-1000 and will be referred to as such hereinafter.

The DIR-1000 stores compressed video data for a number of different transmissions, preferably in an MPEG 2 compression format. The DIR-1000 is capable of high speed output of either 128 Mbps or 256 Mbps.

With reference to FIG. 2, a second embodiment of the present system may include a high speed video data replay apparatus 80 (DIR-1000), a master unit 30 and associated waterfall storage array 50 and a plurality of slave units 90(1) to 90(n) and associated waterfall storage arrays 50. The waterfall storage arrays 50 are identical in architecture to those discussed above in relation to FIG. 1.

In this embodiment, each of the slave units include a buffer storage means 91 which is capable of temporarily storing signals directed to that slave unit and a logic unit 92 for determining which signals are destined for that unit. The buffer storage means 91 are high input/output bandwidth devices as they must be capable of receiving high data rate transmissions from the DIR-1000 80. The master unit 30 includes a signal router 31 for directing incoming video data signals to specific slave units. The master unit also includes a high input/output bandwidth data store 32 for storing high data rate transmissions from the DIR-1000 80 prior to transfer of those transmissions to the attached waterfall array 50.

In use, the DIR-1000 80 is cued to a point and played at a high data rate into the master unit 30. Enough data is transferred to last for one transmission spur. If we assume that the DIR-1000 80 is transferring information to the master unit at approximately 128 Mbps and that replay in the waterfall storage array 50 occurs at approximately 8 Mbps then the transfer of data, sufficient to cover one 15 minute transmission spur, from the DIR-1000 80 to the master unit 30 would take around 57 seconds. The master unit 30 would then be provided with approximately 15 minutes of video data which may be replayed via its waterfall storage array 50. In effect, therefore, by virtue of the high speed video data replay of the DIR-1000 80 there now exists a period of approximately 14 minutes in which second and subsequent transmissions may be replayed to one of a number of slave units connected to the master unit.

In this embodiment, the master unit 30 contains a signal router 31 which is capable of routing signals to specific slave units. Each slave unit includes a temporary storage device 91 which is capable of storing data from the master unit 30 prior to its insertion into the attached waterfall array 50. Similarly, the master unit 30 also includes a temporary storage device 32 for storing data prior to inserting that data into the master unit's waterfall array 50. This embodiment has a plurality of slave units connected in a series array to the master unit 30, each respective slave unit being transparent to all signals apart from those specifically directed thereto. As mentioned above, these temporary storage devices 32, 91 must have a high input/output bandwidth in order to be capable of receiving the high data rate transmissions from the DIR-1000 80.

As described above, the master unit has been provided with fifteen minutes of video data transmission in a 57 second burst from the DIR-1000 80. That data is stored in the master unit's temporary storage device 32 and fed into the master unit waterfall 50. The DIR-1000 80 is then cued to a different point on its storage media and replays a second video transmission at high speed into the master unit 30. The signal router 31 in the master unit relays this second transmission data to the temporary storage device in the first slave unit 90(1), for example. The first slave unit then feeds this data from its temporary store 91 to its attached waterfall array 50.

This process is repeated to second and subsequent slave units 90(2) to 90(n). In this example, if a delay spur of 15 minutes is desired, then each high speed transmission takes approximately 57 seconds. Thus, if cue delays are small, then one delay spur may be used to transmit 14 further separate transmissions before the DIR-1000 is required to provide the master unit with a second 15 minute slice of the first video transmission.

In this way, it is conceivable that a single DIR-1000 may provide a large number of different transmissions, each of which is transmitted in an NVOD format.

As discussed above, improved use of the present system comes with a DIR-1000 system. However, it is conceivable that alternative systems may be utilised if required. For example, the DIR-1000 could be replaced with a plurality of high speed video tape recorders and suitable switching means for switching between different devices as required. Alternatively, the DIR-1000 could be replaced with a high speed video recorder that has a plurality of different transmissions stored at discrete locations on the recorder's storage media.

This system exhibits a greatly advantageous arrangement with respect to the prior art arrangements, all of which utilise a plurality of high input/output bandwidth storage units. It is the necessity of providing such a large number of these units that pushes the cost of the overall system to an unacceptable level. The present system, in contrast, uses only one high input/output bandwidth storage unit in each of the master unit and attached slave units. These high bandwidth units are capable of accepting high data rate transmissions from the DIR-1000 80 and then outputting that data at a much lower data rate to their attached waterfall arrays. Each unit of the array accepts this low data rate transmission and replays via its attached decoder whilst simultaneously transferring the data to the next unit in the array. Thus, the array unit's data transfer rate need only be twice that of its eventual reply rate. This enables the utilisation of relatively inexpensive storage media thereby reducing the cost of the overall system.

Figure 3:
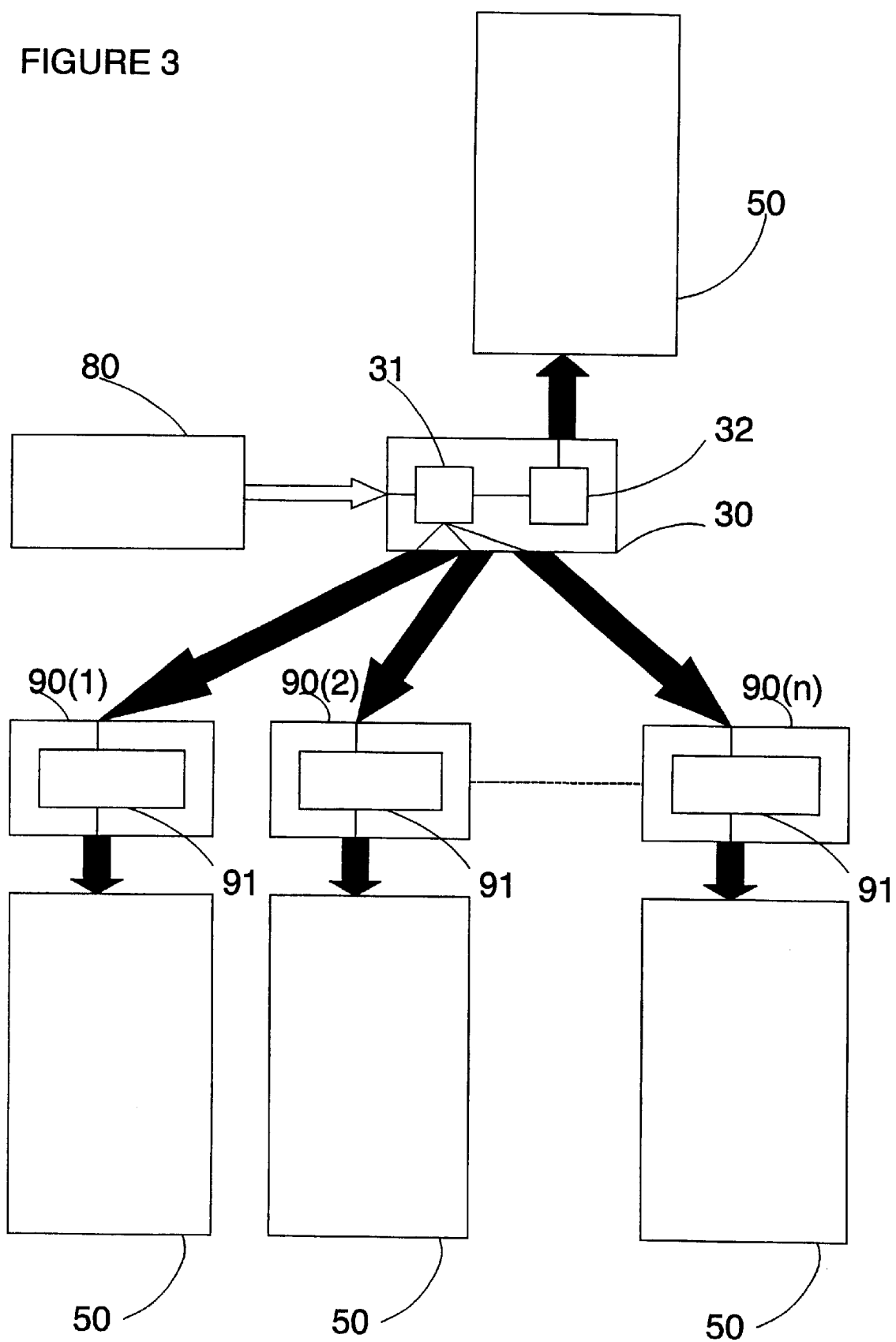
FIG. 3 is a schematic representation of a second embodiment of an NVOD server utilising the above mentioned multi-channel video storage device.

FIG. 3 illustrates a third embodiment of the NVOD system. This third embodiment operates in a similar way to that described above in relation to FIG. 2 and differs only in that each slave unit 90(1) to 90(n) is directly connected to the master unit 30. In this embodiment, therefore, the slave units 90(1) to 90(n) may be simpler as the slave unit control devices do not require the logic units 92 for recognising signal destinations.

In all of the above embodiments it is preferred that each element of the waterfall array 50 comprises an input buffer, reproducing means and an output buffer. Incoming data is first stored in the input buffer and constantly fed to the reproducing means which reproduces the input data and feeds the reproduced data to its attached decoder for transmission. Simultaneously, the input data is passed to an output buffer for transferal, in small bursts, to the input buffer of the waterfall unit immediately therebelow. The input buffer and output buffer can both be embodied as a magnetic disk storage unit.

Thus, there is herein described a system whereby the majority of the storage devices need only have a data transfer bandwidth twice that of the required video data bandwidth.

Figure 4:
FIG. 4 illustrates an exemplary time scheme showing the operating sequence of an apparatus as depicted in FIGS. 3 or 4.
Figure 4:
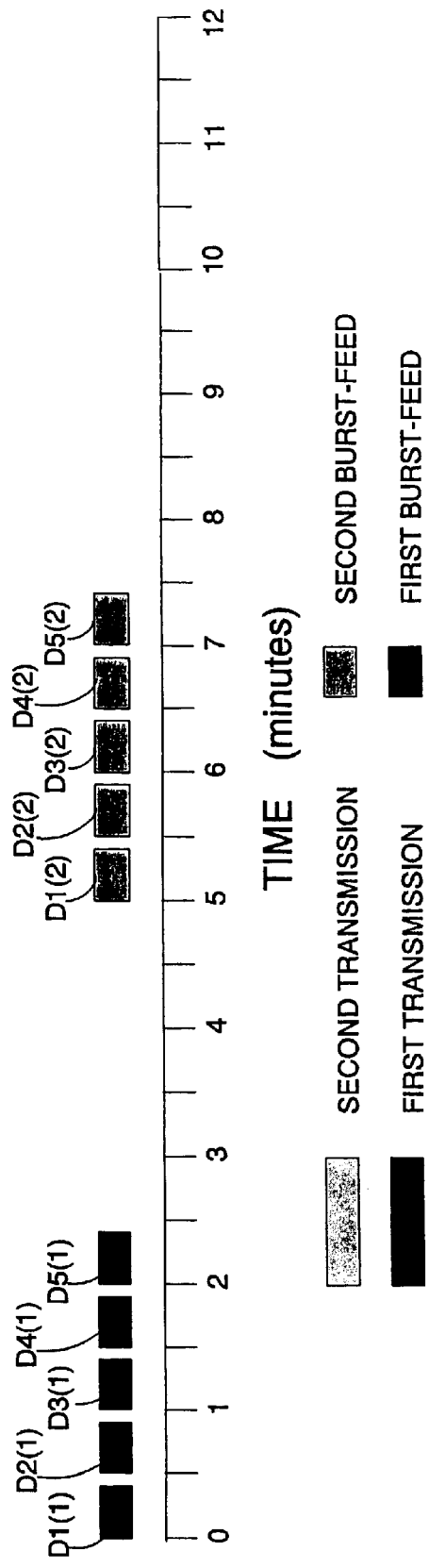

FIG. 4 illustrates schematically an exemplary operating sequence of an NVOD system according to the above mentioned second and third embodiments.

At time T=0, the high speed video data replay apparatus (preferably a DIR-1000) 20 replays data at 128 Mbps into the master unit 30. In this example, the delay spur is approximately 5 minutes and thus the high speed transfer D1(1) of data from the DIR-1000 to the master unit would last approximately 20 seconds. Shortly thereafter, at approximately time T=0.5 the master unit would start to feed the data to its waterfall array for transmission.

The DIR-1000 would then be free at time T=0.5 to play at high speed another transmission D2(1) into the first slave unit. Shortly after this transfer, at time T=1.0 the first slave unit then feeds the data to its waterfall array for transmission. Meanwhile, at time T=1.0, the DIR-1000 has begun another high speed replay D3(1) into the second slave unit.

At time T=1.5, the DIR-1000 has finished replaying data at high speed into the second slave and the second slave passes that data to its attached waterfall array for transmission. The DIR-1000 then commences another high speed replay D4(1) of data into the third slave unit. At time T=2.0, the third slave unit then passes that data to its waterfall array and the DIR-1000 commences another high speed replay D5(1) into the fourth slave unit. At time T=2.5, the fifth replay D5(1) from the DIR-1000 has finished and the fourth slave commences transferal of that data to its attached waterfall array for transmission.

In this example, the DIR-1000 then lies idle for approximately 2.5 minutes until time T=5. However, it will be apparent that this need not be the case. In this example, the number of channels has been limited to 5 in order to simplify the explanation. However, it would of course be possible to fit a further 5 DIR-1000 high speed transmissions (and thus a further 5 slave units) into this system. Indeed, the amount of time between successive high speed data transfers could be reduced so as to further increase the number of available channels.

However, it will be apparent that at 128 Mbps input and 8 Mbps output, with no delay between successive high speed transmissions, a maximum of 16 different transmissions is possible; whatever the delay spur.

As an option for all the above embodiments, the signals between individual units of the system may be in an SDDI (Serial Digital Data Interface) format. This format enables the direction of information to a particular address and works by allocating discrete addresses to particular locations such that data bearing those addresses is routed to the correct location. In such a case, the logic means 92 and signal router 31 may also be dispensed with. However, additional encoding means will have to be utilised to encode the data either prior to recordal on the storage apparatus 20, 80 or prior to transferal of that data around the system.

As a further option for all of the above embodiments, each of the waterfall units may contain bypass means under control of the master unit, the bypass means being provided to allow the stream of data from the DIR 1000, or other replay means, to bypass any malfunctioning storage devices in respective waterfall units.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for providing a plurality of output video signals for near video on demand transmission, said apparatus comprising:

(i) a control unit connected to a primary video data storage means for receiving video data therefrom; and (ii) a temporary storage and replay array for storing and replaying said video data, said array comprising a plurality of serially connected individual storage units, a first of said storage units being connected to said control unit for data transfer therebetween;

wherein, in use, data is transferred sequentially from said control unit to said first storage unit for transmission, said first storage unit retransferring said data to a second and subsequent storage units for retransmission without transferring said data back through said control unit.

2. Apparatus according to claim 1, wherein said primary video data storage means is a conventional speed video tape recorder.

3. Apparatus according to claim 1, wherein said control unit is connected to at least one slave unit, each of said slave units being connected to an associated storage and replay array, data from said primary video data storage means being directed to specific slave units.

4. Apparatus according to claim 3, wherein said control unit directs incoming data from said primary video data storage means to any of said storage and replay arrays connected to said control unit and specific ones of said at least one slave unit.

5. Apparatus according to claim 3, wherein said primary video data storage means is at least one high speed video data recorder.

6. Apparatus according to claim 3, wherein said temporary storage and replay array supplies data to said control unit in bursts, the burst rate being substantially higher than said near video on demand transmission rate.

7. Apparatus according to claim 6, wherein said burst data rate is approximately 128 Mbps or approximately 256 Mbps, and said near video on demand transmission rate is approximately 8 Mbps.

8. Apparatus according to claim 3, wherein said control unit includes a router for directing information from said data storage means to individual ones of said storage and replay array.

9. Apparatus according to claim 3, wherein said at least one slave unit includes a logic unit for recognising data destined for that slave unit, and a buffer for storing data prior to the insertion of that data into the attached array.

10. Apparatus according to claim 1, wherein said control unit is connected to an array of serially connected slave units, each of said slave units being connected to an associated storage and replay array, data from said primary video data storage means being directed to specific slave units.

11. Apparatus according to claim 10, wherein said control unit directs incoming data from said primary video data storage means to any of said storage and replay arrays connected to said control unit and specific ones of said at least one slave unit.

12. Apparatus according to claim 10, wherein said primary video data storage means is at least one high speed video data recorder.

13. Apparatus according to claim 10, wherein said temporary storage and replay array supplies data to said control unit in bursts, the burst rate being substantially higher than said near video on demand transmission rate.

14. Apparatus according to claim 13, wherein said burst data rate is approximately 128 Mbps or approximately 256 Mbps, and said near video on demand transmission rate is approximately 8 Mbps.

15. Apparatus according to claim 10, wherein said control unit includes a router for directing information from said data storage means to individual ones of said storage and replay array.

16. Apparatus according to claim 10, wherein said at least one slave unit includes a logic unit for recognising data destined for that slave unit, and a buffer for storing data prior to the insertion of that data into the attached array.

17. Apparatus according to claim 1 wherein said individual storage units are computer hard disks.

18. Apparatus according to claim 1, wherein said individual storage units have an input bandwidth twice that of their output bandwidth.

19. Apparatus according to claim 1, wherein each of said individual storage units includes a video data decoder, said data being transferred to respective video data decoders for transmission.

20. Apparatus according to claim 1, further comprising a switch under control of said control unit for initiating a feedback path, said feedback path comprising a connection between a last unit of said array and said first unit such that said data, once introduced into said array, may be continuously circulated therein.

21. A method of providing a plurality of output video signals for near video on demand transmission, said method comprising the steps of:

(i) replaying video data from a primary video data storage means to a control unit;

(ii) transferring said data from said control unit to at least one temporary storage and replay array comprising a plurality of individual storage units, a first storage unit of said storage and replay array being connected to said control unit;

wherein, in use, said data is transferred sequentially from said control unit to said first storage unit for transmission, said first storage unit retransferring said data to a second and subsequent storage units for retransmission without transferring said data back through said control unit.

\* \* \* \* \*